(12) United States Patent
Aslam

(10) Patent No.: US 10,816,142 B2
(45) Date of Patent: Oct. 27, 2020

(54) METHODS FOR PROTECTING PIPELINES

(71) Applicant: Naveed Aslam, Houston, TX (US)

(72) Inventor: Naveed Aslam, Houston, TX (US)

(73) Assignee: LINDE AKTIENGESELLSCHAFT (DE)

( * ) Notice: Subject to any disclaimer, the term of this patent is extended or adjusted under 35 U.S.C. 154(b) by 198 days.

(21) Appl. No.: 15/474,114

(22) Filed: Mar. 30, 2017

(65) Prior Publication Data
US 2018/0283596 A1    Oct. 4, 2018

(51) Int. Cl.
*C09K 8/52* (2006.01)
*F17D 3/12* (2006.01)
*C23F 11/02* (2006.01)
*F16L 58/00* (2006.01)

(52) U.S. Cl.
CPC ............... *F17D 3/12* (2013.01); *C09K 8/52* (2013.01); *C23F 11/02* (2013.01); *F16L 58/00* (2013.01); *C09K 2208/10* (2013.01); *C09K 2208/32* (2013.01)

(58) Field of Classification Search
CPC .. C09K 8/54; C23F 11/02; F16L 58/00; F17D 3/12
See application file for complete search history.

(56) References Cited

U.S. PATENT DOCUMENTS

| | | | |
|---|---|---|---|
| 7,493,955 B2* | 2/2009 | Gupta | C09K 8/516 166/279 |
| 2010/0247922 A1* | 9/2010 | Shah | C09D 5/082 428/418 |
| 2014/0060832 A1* | 3/2014 | Mahoney | E21B 43/267 166/280.2 |
| 2015/0315142 A1* | 11/2015 | Gomez | C07D 233/22 548/565 |
| 2018/0119006 A1* | 5/2018 | Pangilinan | C09D 133/26 |

* cited by examiner

*Primary Examiner* — Alicia Bland
(74) *Attorney, Agent, or Firm* — Iurie A. Schwartz

(57) ABSTRACT

A method for inhibiting corrosion in pipelines for transporting oil and gas is described. A nano-machine is fed along with an inert gas to the pipeline to deliver a corrosion inhibitor which is chemically bonded to the nano-machine. The nano-machine is made by attaching a corrosion inhibitor to a nanoparticle by way of a covalent bond. When the nano-machine encounters a source of corrosion in the pipeline, the corrosion inhibitor is released to treat the corrosion.

18 Claims, 4 Drawing Sheets

MECHANISM OF INHIBITOR RELEASE THROUGH THE CORROSION PRODUCT DRIVEN CLEAVAGE OF BOND BETWEEN NANO PARTICLE AND INHIBITOR AROUND LOCAL CORROSION SITES

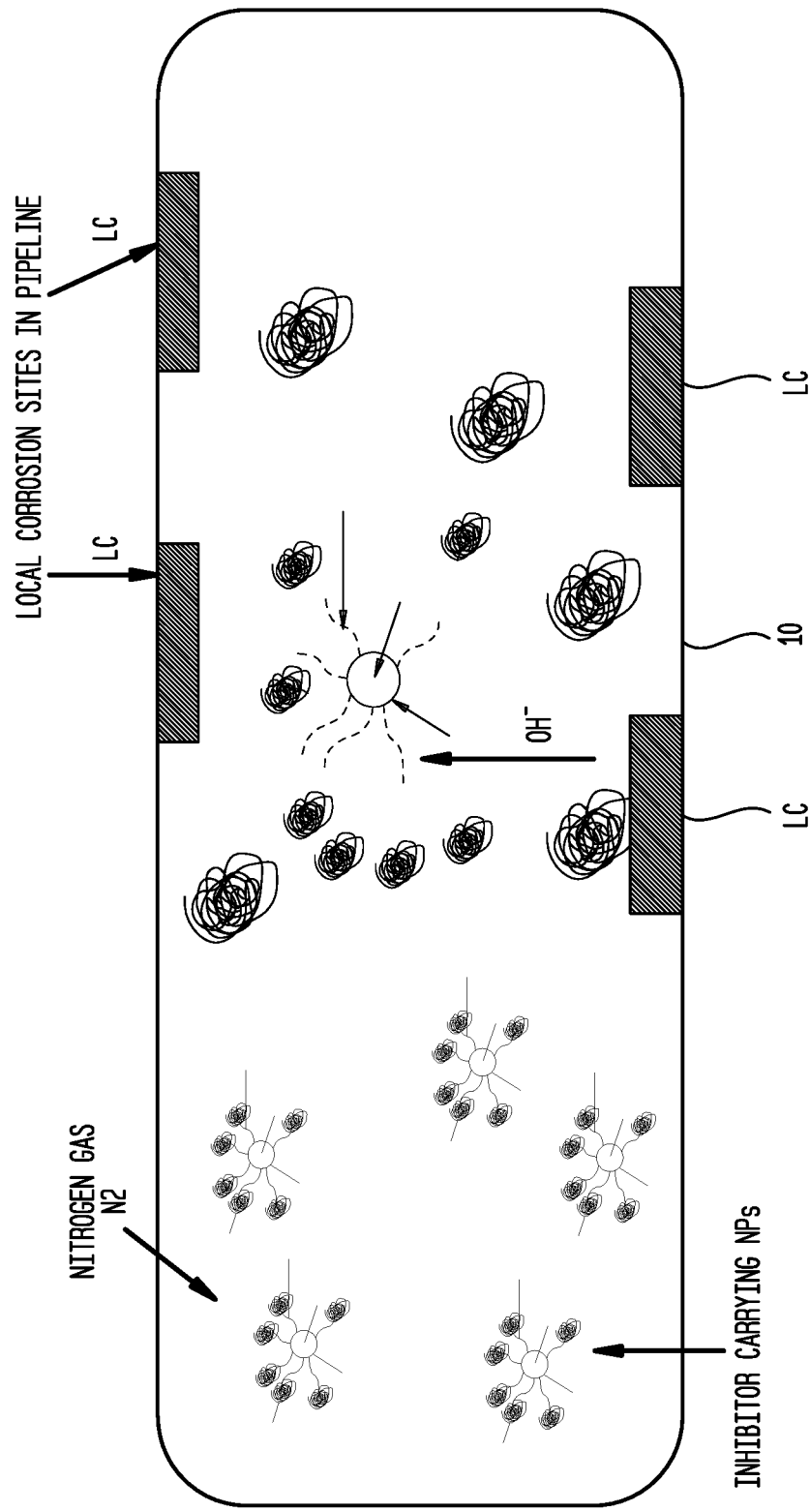

METHODS FOR PROTECTING PIPELINES

BACKGROUND OF THE INVENTION

Hydrocarbons are frequently transported via pipeline systems which can be situated in a number of locations such as underground, undersea or above ground. These pipelines will become dirty through this contact with the hydrocarbons and contaminants therein. Gases are typically used to clean these impurities in pipelines and related process equipment as their pressure force transfers its momentum to trapped solid or liquid particles, and removes these deposits through mechanical force.

Typically, an inert gas such as nitrogen or argon is used for this purpose. However, these gases tend to have limited utility as most solid and liquid contaminants and impurities are not readily soluble in inert gases. Combine this with limitations of momentum transfer from gas to impurity and their removal mechanisms can be somewhat limited.

Alternatively, pigs are employed to clean the pipelines. These pigs are based on high density solid materials and are inserted into the pipeline where the flow of the hydrocarbons pushes it down the pipe. The pig will contact the sides of the pipeline and clean off impurities, all without stopping the flow of the hydrocarbons in the pipeline.

However, pigs also have certain drawbacks due to their size and weight and particularly with respect to variations in pipeline conditions.

For example, 42% of natural gas lines and 11% of liquid lines in the United States cannot accommodate traditional pigs due to physical limitations. The piggability of a specific pipeline is not a very well defined metric and could vary from service to region.

Typical key factors in defining piggability are length of the pipeline. The distance between two pig traps is variable and can cause a wear and tear and loss of functionality of pigs as evidenced by natural gas pipelines having 50 to 100 miles between traps. This is further an issue where refined products are 100 to 150 miles between traps and crude oil pipelines are 150 to 200 miles between traps. Additionally, dual diameter pipelines and reducers are variable. Linings are used in pipelines to protect the inside of the pipe from the effects of the products travelling therein and to create less resistance. Pigs can damage these linings which can lead to pipeline failure. Bends need to be forged, particularly when the radius of the pipeline is small and solid pigs can get stuck at these bends. Further field bends can cause local deformations exceeding 2 to 3% of the pipeline diameter which can cause problems for the pig travelling through the pipeline.

Additionally, miter bends, wall thickness variations, tees, off-takes, barred tees, valves and check valves, pipe elevations and spans and non-engineered spans, drips, siphons and pipeline carrots and coupon holders all introduce variables in the pipeline that make traditional pigging operations problematic.

Cleaning and monitoring of oil and gas pipelines after service or after routine shutdown or for new service is an essential component of safe and successful operation and delivery of energy products. The routine cleaning of pipelines is essential for consistent product specification and full capacity operations. Cleaning and monitoring these large systems requires large scale effort such as water washing for cleaning and decontamination or extensive pigging. For long distance gas pipelines, the cleaning is done through pigging. Pigging though effective is not always a trouble free operation and may not lead to a complete cleaning. Further, the mechanical action of pigs can lead to the possible loss of coatings and pipeline materials.

Further corrosion inside of oil and gas pipelines can be a major issue, particularly in the United States where pipeline assets are getting older and their integrity and reliability need to be ensured. Midstream operating companies can spend significant amounts of money in maintaining these assets and ensuring a safe, reliable and affordable operation of energy transfer.

Local corrosion inside the pipeline is on the major causes of failure and leak of oil, gas or finished products. Operating companies employ batching operations to deliver inhibitor inside the pipeline. The batching inhibitor can be trapped between two pigs and this assembly is moved along the length of the pipeline thereby applying the inhibitor throughout the length of the pipeline. This can be an expensive proposition and inhibitor is applied to areas where it is not needed. The present invention provides an on-demand system for the application of corrosion inhibitor inside the pipeline through an inert carrier gas such as nitrogen.

SUMMARY OF THE INVENTION

In a first embodiment of the invention, there is disclosed a method for introducing a corrosion inhibitor into a pipeline comprising feeding a nano-machine to the pipeline.

In another embodiment of the invention, there is disclosed a method for introducing a corrosion inhibitor into an oil and gas pipeline comprising feeding a nano-machine containing the corrosion inhibitor and a nitrogen atmosphere to the pipeline.

The pipelines that can be treated by the methods of the present invention include oil and gas pipelines. This could include main transmission lines as well as gathering lines.

The methods of the present invention can be employed in pipelines that are operating live as in carrying actual product to a destination. The methods could also be employed during commissioning of a pipeline, or during turn around operations.

The nano-machine will comprise a nanoparticle that has been chemically or mechanically modified such that covalent chemical bonds will connect the surface of the nanoparticle with a corrosion inhibitor. The nanoparticle can be any typical material such as minerals like Boehmite which is white and relatively soft basic aluminum oxide (AlO(OH)). This type of material can be converted into a nanoparticle through a process such as sol-gel or laser ablation.

The corrosion inhibitor will typically be a material that will not be damaged by being in the presence of a hydrocarbon ("hydrocarbon resistant") such as oil or gas. For example, 2-amino-6-methylbenzothiazole could be employed as the corrosion inhibitor.

The methods of the present invention can employ any traditional corrosion inhibitors that would be employed to treat the corrosion of metals that are hydrocarbon resistant. For example, a novel corrosion inhibitor could be a palm oil-based amide corrosion inhibitor. This compound is prepared by inserting hydroxyethyl ethylenediamine at 140° C. into palm oil for three hours.

The base of the nanoparticles is typically selected from the group consisting of silica, zinc, iron or titanium. The base may also be a polymer, depending upon the application, dissolution into the gas and cost.

The nanoparticles could also be constructed in a manner where a core and a shell surrounding the core may be made of the same material. The core would be denser and the shell more porous which would facilitate the creation of covalent bonds with the corrosion inhibitors.

The nanoparticle could further include microscale particles having more porous structures thereby allowing corrosion inhibitor to be carried into the particle pores and delivered within the pipeline where needed.

For purposes of the invention, the nano-machines can comprise two or more different corrosion inhibitors.

Two or more different nanoparticles could be employed in the nano-machine which would provide for a nano-machine with two or more different corrosion inhibitors covalently bonded to the nanoparticles. This ability to mix and match different nanoparticles with different corrosion inhibitors would allow for operators of the pipeline system to treat different types of metallic corrosion with one treatment of nano-machines.

The nano-machines are present at concentrations up to 1% in the nitrogen atmosphere that is fed to the pipeline. The inventor anticipates that concentrations over 1% could be employed but it is preferred to add the nano-machines at concentrations of 1% or less.

The pipelines that can be treated can be those carrying liquids or gases. For example, liquids could include fine chemical products, natural gas liquids and crude oils while gases could include carbon dioxide and natural gas.

While nitrogen is the preferred carrier/composition for the nano-machines, other inert gases such as argon can be employed.

The inert gas containing the nano-machines can be introduced into the pipeline through nozzles. The nanoparticles can be pre-mixed with the inert gas or added after introduction of the inert gas to the pipeline.

After the nanoparticles release the corrosion inhibitor(s) in the vicinity of a corrosion event in the pipeline, they will continue in transport through the length of the pipeline and will be flushed out with the inert gases in an environmentally responsible manner.

In an alternative embodiment of the present invention, the entirety of the nano-machine would deposit on the surface of the corrosion event on the pipeline thereby providing surface passivation to the pipeline.

The inert gas could be added along with the nano-machines to a pipeline at pressures of about 200 to 1600 psig at temperatures ranging from 25° to 35° C. The inert gas in a 24-inch pipeline could have a length of 1 to 2 miles passing through the pipeline at a velocity of 7 to 20 feet per second (fps).

The invention further provides for a method of gas phase or vapor phase inhibition of corrosion. This method allows the insertion of corrosion inhibitor in the inert gas or vapors thus allowing inhibitor to travel in gas or vapor phase and selectively interact with corroding metal surfaces thus releasing inhibitor based on the on-demand basis, the vapor phase inhibition could be valuable for petrochemical plants and refineries.

BRIEF DESCRIPTION OF THE DRAWINGS

FIG. 4 is a schematic of a pipeline and the interaction of the nano-machines for delivery of a corrosion inhibitor to local corrosion sites in the pipeline.

DETAILED DESCRIPTION OF THE INVENTION

Figure 1:
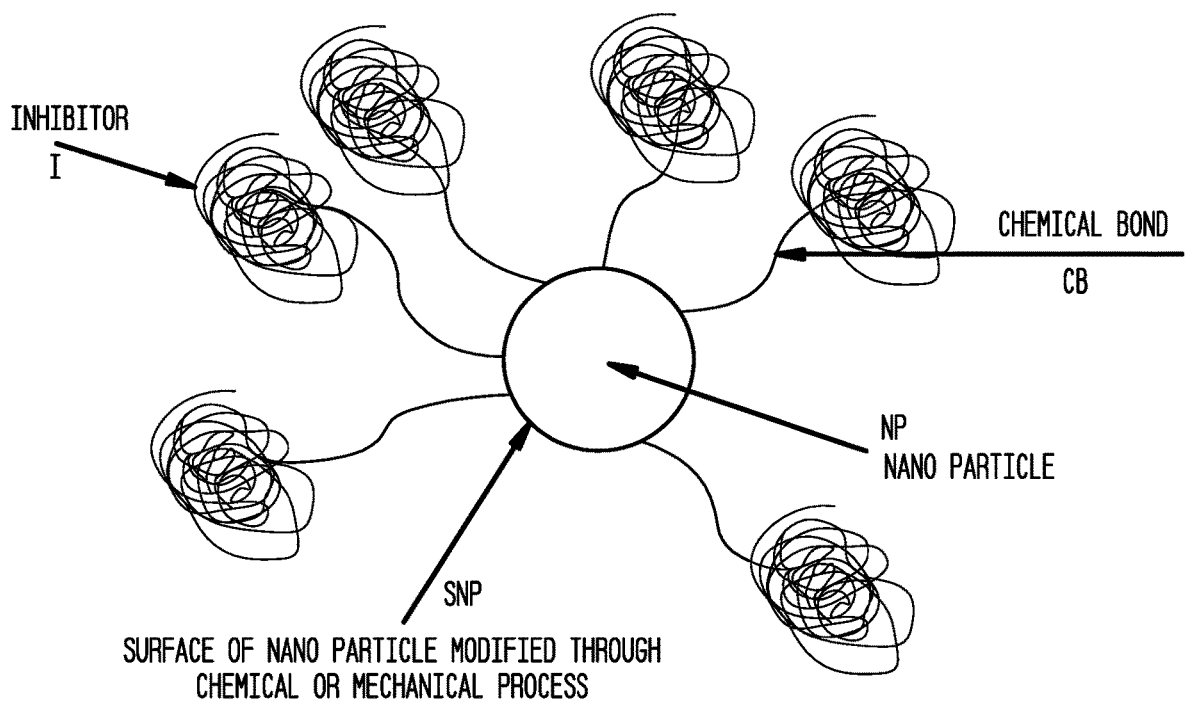
FIG. 1 shows a nano-machine for delivery of a corrosion inhibitor.

FIG. 1 shows a nano-machine according to the invention which can be used for the on-demand local delivery of a corrosion inhibitor inside an oil and gas pipeline.

A nanoparticle (NP) forms the center of the nano-machine. The surface of the nanoparticle (SNP) is modified through a chemical or mechanical process which allows for the attachment through a chemical bond (CB) of a corrosion inhibitor (I). This corrosion inhibitor can be employed to assist in treating localized corrosion sites in an oil and gas pipeline.

Figure 2:
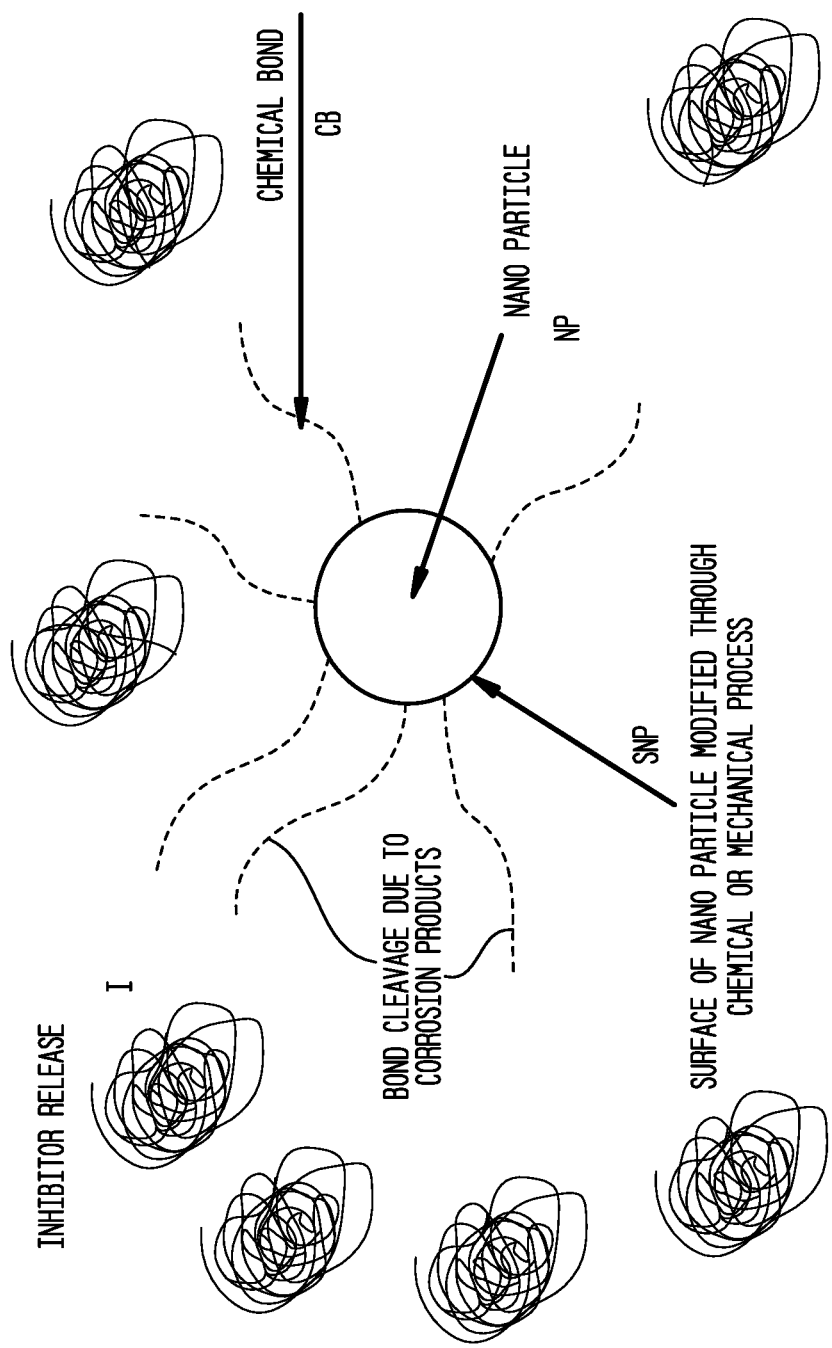
FIG. 2 shows a nano-machine releasing a corrosion inhibitor.

FIG. 2 demonstrates the action of the nano-machine in the region of localized corrosion sites in an oil and gas pipeline. This mechanism of inhibitor release shows how the chemical bonds (CB) formed can be tailored to the type and/or composition of corrosion products encountered by the nanoparticle (NP). This bond will cleave between the inhibitor (I) and the surface of the nanoparticle (SNP)

Figure 3:
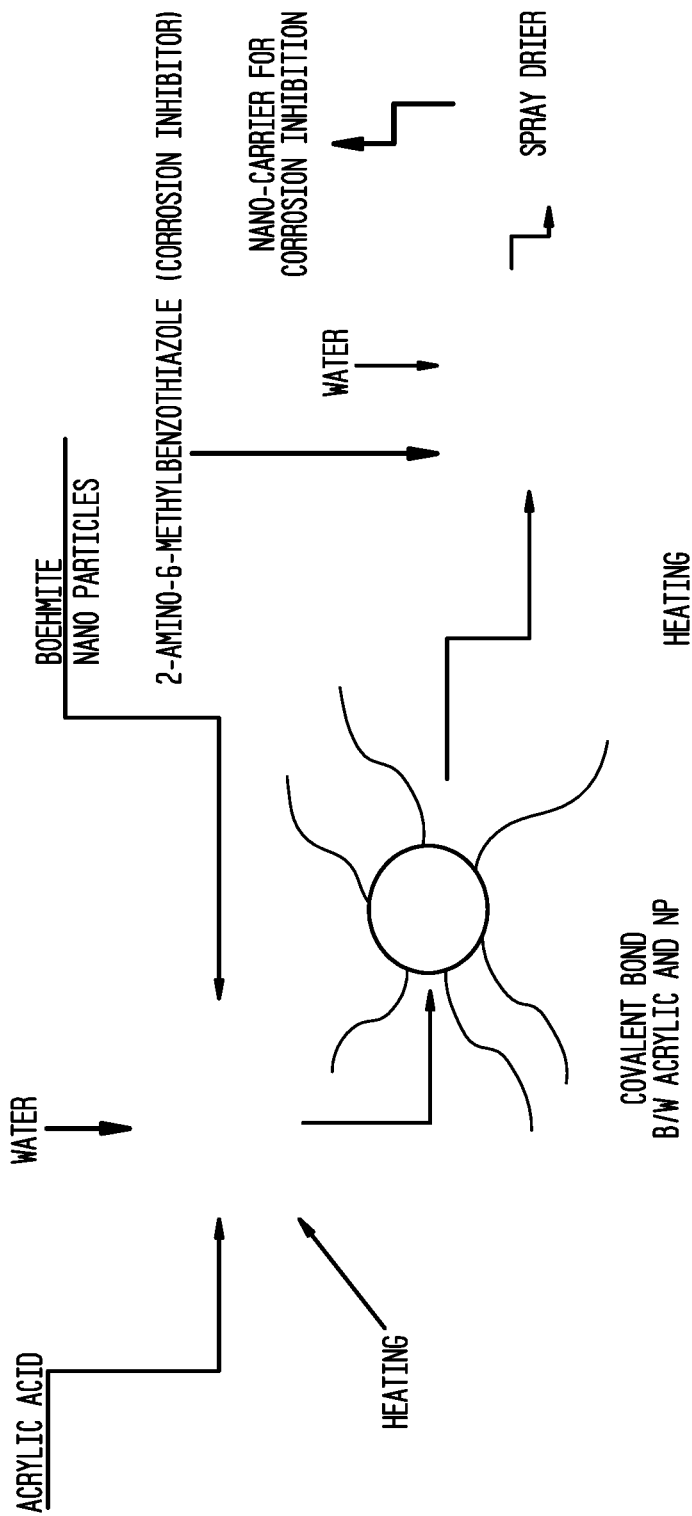
FIG. 3 shows the chemical synthesis of a nano-machine for delivery of a corrosion inhibitor.

FIG. 3 shows the synthesis steps of the chemical reaction for forming a nano-machine for the delivery of a corrosion inhibitor to a local corrosion deposit in an oil and gas pipeline. Acrylic acid and water are heated together along with a nanoparticle comprising Boehmite, an aluminum oxide hydroxide mineral. The resulting nanoparticle comprises the nanoparticle along with resulting covalent bonds The nanoparticle thus created is added to a solution of water with a corrosion inhibitor dissolved therein. For example, 2-amino-6-methylbenzothiazole may be added to water to form a solution and this molecule will attach covalently to the nanoparticle. The resulting nano-machine will then be dried in a spray drier and can then be added to an oil and gas pipeline.

FIG. 4 is a schematic showing the presence of the nano-machines in nitrogen gas in a pipeline. The pipeline 10 shown here has several local corrosion sites (LC) that need to be treated otherwise holes could form and leakage could occur as well as loss of structural integrity.

The shaded area shows the nitrogen (N2) gas that will contain the nano-machines that will be added to the pipeline 10 to assist with treating local corrosion sites in the pipeline LC. As the nitrogen progresses through the pipeline from left to right in FIG. 4, the nano-machines will encounter the local corrosion sites LC and in response will release the corrosion inhibitor that is covalently attached to the nanoparticle that is the core of the nano-machine, thereby emitting a hydroxyl ion. The corrosion inhibitor will interact with the local corrosion while other nano-machines still containing the corrosion inhibitor will progress further along the pipeline until they encounter a local corrosion in the pipeline.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what I claim is:

1. A method for introducing a corrosion inhibitor into a pipeline comprising feeding at least one nano-machine to the pipeline wherein the nano-machine comprises a nanoparticle comprising a silica base covalently bonded with a corrosion inhibitor.

2. The method as claimed in claim 1 wherein the pipeline is selected from the group consisting of oil pipelines and gas pipelines.

3. The method as claimed in claim 1 wherein the corrosion inhibitor is 2-amino-6-methylbenzothiazole.

4. The method as claimed in claim 1 wherein the nanoparticle comprises a core and a shell.

5. The method as claimed in claim 1 wherein a palm oil-based amide corrosion inhibitor is further chemically bonded to the nanoparticle.

6. The method as claimed in claim 1 wherein the nano-machine is fed to the pipeline in an inert gas atmosphere.

7. The method as claimed in claim 6 wherein the inert gas is nitrogen.

8. The method as claimed in claim 7 wherein the nano-machine has a concentration up to 1% in the inert gas.

9. The method as claimed in claim 1 wherein the nanoparticle releases the corrosion inhibitor in the vicinity of corrosion in the pipeline.

10. A method for introducing a corrosion inhibitor into an oil and gas pipeline comprising feeding at least one nano-machine containing the corrosion inhibitor wherein the nano-machine comprises a nanoparticle comprising a silica base covalently bonded with a corrosion inhibitor and a nitrogen atmosphere to the pipeline.

11. The method as claimed in claim 10 wherein the pipeline is selected from the group consisting of oil pipelines and gas pipelines.

12. The method as claimed in claim 10 wherein the corrosion inhibitor is 2-amino-6-methylbenzothiazole.

13. The method as claimed in claim 10 wherein the nanoparticle comprises a core and a shell.

14. The method as claimed in claim 10 wherein a palm oil-based amide corrosion inhibitor is further chemically bonded to the nanoparticle.

15. The method as claimed in claim 10 wherein the nano-machine has a concentration up to 1% in the nitrogen atmosphere.

16. The method as claimed in claim 10 wherein the nanoparticle releases the corrosion inhibitor in the vicinity of corrosion in the pipeline.

17. The method as claimed in claim 10 further comprising the nanoparticle releasing the corrosion inhibitor into the nitrogen atmosphere.

18. The method as claimed in claim 17 wherein the released corrosion inhibitor flows with the nitrogen atmosphere until the corrosion inhibitor contacts a corrosion site in the pipeline.

* * * * *